United States Patent
Eddington et al.

(10) Patent No.: US 9,518,566 B2
(45) Date of Patent: Dec. 13, 2016

(54) SHAPE MEMORY ALLOY ACTUATION APPARATUS

(71) Applicant: CAMBRIDGE MECHATRONICS LIMITED, Cambridge, Cambridgeshire (GB)

(72) Inventors: Robin Eddington, Cambridge (GB); James Howarth, Cambridge (GB); Andrew Benjamin David Brown, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 14/402,576

(22) PCT Filed: May 21, 2013

(86) PCT No.: PCT/GB2013/051325
§ 371 (c)(1),
(2) Date: Nov. 20, 2014

(87) PCT Pub. No.: WO2013/175197
PCT Pub. Date: Nov. 28, 2013

(65) Prior Publication Data
US 2015/0135703 A1    May 21, 2015

(30) Foreign Application Priority Data

May 25, 2012  (GB) .................................. 1209230.0
Oct. 11, 2012  (GB) .................................. 1218271.3

(51) Int. Cl.
*G03B 5/02* (2006.01)
*F03G 7/06* (2006.01)
(Continued)

(52) U.S. Cl.
CPC ............. *F03G 7/065* (2013.01); *G02B 27/646* (2013.01); *G03B 5/00* (2013.01); *H04N 5/23287* (2013.01);
(Continued)

(58) Field of Classification Search
USPC ............................................................ 396/55
See application file for complete search history.

(56) References Cited

U.S. PATENT DOCUMENTS 4,932,210 A    6/1990   Julien et al.
5,279,123 A    1/1994   Wechsler et al.
(Continued)

FOREIGN PATENT DOCUMENTS

CN    202077117 U    12/2011
EP      2813877 A1    12/2014
(Continued)

*Primary Examiner* — Minh Phan
(74) *Attorney, Agent, or Firm* — Harness, Dickey & Pierce, P.L.C.

(57) ABSTRACT

An SMA actuation apparatus moves a movable element relative to a support structure in two orthogonal directions using a total of four SMA actuator wires each connected at its ends between the movable element and the support structure and extending perpendicular to the primary axis. None of the SMA actuator wires are collinear, but the SMA actuator wires have an arrangement in which they are capable of being selectively driven to move the movable element relative to the support structure to any position in said range of movement without applying any net torque to the movable element in the plane of the two orthogonal directions around the primary axis. Accordingly, it is possible to drive movement whilst balancing the forces to limit torque around the primary axis.

20 Claims, 5 Drawing Sheets (51) Int. Cl.
 *G02B 27/64* (2006.01)
 *H04N 5/232* (2006.01)
 *G03B 5/00* (2006.01)

(52) U.S. Cl.
 CPC ............... *G03B 2205/0015* (2013.01); *G03B 2205/0076* (2013.01)

(56) References Cited

U.S. PATENT DOCUMENTS

| | | |
|---|---|---|
| 8,559,803 B2 | 10/2013 | Huang et al. |
| 2001/0022688 A1 | 9/2001 | Kosaka et al. |
| 2006/0150627 A1 | 7/2006 | Oohara |
| 2007/0109412 A1 | 5/2007 | Hara |
| 2010/0265343 A1 | 10/2010 | Lee et al. |
| 2011/0249131 A1* | 10/2011 | Topliss et al. ............. 348/208.7 |
| 2012/0251088 A1 | 10/2012 | Huang et al. |

FOREIGN PATENT DOCUMENTS

| | | |
|---|---|---|
| WO | WO-2007/113478 A1 | 10/2007 |
| WO | WO-2010/029316 A2 | 3/2010 |
| WO | WO 2010049689 A2 * | 5/2010 |
| WO | WO-2010/089529 A1 | 8/2010 |
| WO | WO-2011/104518 A1 | 9/2011 |
| WO | WO-2012/077285 A1 | 6/2012 |
| WO | WO-2013/118601 A1 | 8/2013 |
| WO | WO-2013/153400 A2 | 10/2013 |

* cited by examiner

SHAPE MEMORY ALLOY ACTUATION APPARATUS

CROSS-REFERENCE TO RELATED APPLICATIONS

This application is a 371 U.S. National Stage of International Application No. PCT/GB2013/051325, filed May 21, 2013, which claims priority to United Kingdom Patent Applications Nos. GB 1209230.0, filed May 25, 2012 and GB 1218271.3, filed Oct. 11, 2012. The entire disclosures of the above applications are incorporated herein by reference.

The present invention relates to the use of SMA (shape memory alloy) actuator wires to provide positional control of a movable element supported on a support structure.

There are a variety of types of apparatus in which it is desired to provide positional control of a movable element. SMA actuator wire is advantageous as an actuator in such an apparatus, in particular due to its high energy density which means that the SMA actuator required to apply a given force is of relatively small size.

One type of apparatus in which SMA actuator wire is known for use as an actuator is a camera, particularly a miniature camera. Some examples are as follows. WO-2007/113478 discloses an SMA actuation apparatus in which SMA actuator wire is used to drive movement of a camera lens element along the optical axis, for example for the purpose of focussing an image formed by the camera lens element on an image sensor. WO-2010/029316 and WO-2010/089529 each disclose an SMA actuation apparatus in which SMA actuator wire is used to provide optical image stabilisation (OIS) in a camera by driving tilting of a camera unit including a camera lens element and an image sensor. The tilting is controlled to stabilise the image formed by the camera lens element on an image sensor against vibration, typically caused by user hand movement, that degrades the quality of the image captured by the image sensor. WO-2011/104518 discloses an SMA actuation apparatus in which SMA actuator wire is used to provide OIS in a camera by driving tilting of a camera unit, but with additional degrees of freedom.

The present invention is concerned with an SMA actuation apparatus for moving a movable element relative to a support structure in two orthogonal directions.

According to the present invention, there is provided an SMA actuation apparatus for moving a movable element relative to a support structure in two orthogonal directions, the SMA actuation apparatus comprising:

a support structure;

a movable element supported on the support structure in a manner allowing movement of the movable element relative to the support structure across a range of movement in two orthogonal directions perpendicular to a notional primary axis extending through the movable element; and a total of four SMA actuator wires connected between the movable element and the support structure in an arrangement such that none of the SMA actuator wires are collinear, and such that the SMA actuator wires are capable of being selectively driven to move the movable element relative to the support structure to any position in said range of movement without applying any net torque to the movable element in the plane of the two orthogonal directions around the primary axis.

This SMA actuation apparatus is capable of moving a movable element relative to a support structure in two orthogonal directions, using an arrangement of SMA actuator wires that provides a number of advantages.

As a result of the arrangement around the primary axis, the SMA actuator wires are capable of driving movement of the movable element in two orthogonal directions perpendicular to the primary axis by selective actuation of the SMA actuator wires. This may be achieved whilst minimising the height of the SMA actuator apparatus in the direction of the primary axis, that is perpendicular to the orthogonal directions. This is because the SMA actuator wires may be arranged perpendicular to the primary axis, or else at a small angle thereto, such that the SMA actuator wires have a small extent perpendicular to the primary axis.

Furthermore, the SMA actuator wires have an arrangement in which they are capable, with selective driving, to move the movable element relative to the support structure to any position in said range of movement without applying any net torque to the movable element in the plane of the two orthogonal directions around the primary axis. This may be achieved by a number of different arrangements as discussed further below. In one convenient arrangement, the four SMA actuator wires are arranged in a loop at different angular positions around the primary axis, and successive SMA actuator wires apply a force to the movable element in alternate senses around the primary axis.

With this arrangement of SMA actuator wires, it is possible to drive the SMA actuator wires in a manner that they apply a reduced torque to the movable element as compared to other arrangements. This is because the torques around the primary axis generated in the individual SMA actuators tend to balance one another. The tendency to balance torque is a natural effect of the connection of the SMA actuator wires in this arrangement.

The reduced torque reduces the tendency for the movable element to rotate around the primary axis, and hence reduces the requirements on how the movable element is suspended. Thus, the constraints on any suspension system are reduced, or the need for a suspension system might be avoided so that the movable element is supported by the SMA actuator wires themselves.

Surprisingly, such benefits may be achieved employing just a single set of four SMA actuator wires, which provides for a very simple arrangement.

In one example, the SMA actuation apparatus may be used to provide a camera with OIS. In this example, the SMA actuation apparatus is a camera apparatus further comprising an image sensor fixed to the support structure, and the movable element comprises a camera lens element comprising one or more lenses arranged to focus an image on the image sensor. In this case, the primary axis is the optical axis of the camera lens element. The SMA actuation apparatus may then provide OIS by movement of the camera element laterally of the optical axis, which may be referred to as "shift" or OIS-shift". This is advantageous as it reduces the overall size as compared to a camera in which OIS is provided by tilting of a camera unit including a camera lens element and an image sensor, wherein the camera needs sufficient clearances to accommodate movement of the entire camera unit. The advantages are particularly beneficial in a miniature camera, for example wherein the one or more lenses have a diameter of at most 10 mm.

In order to provide OIS, the SMA actuation apparatus may further comprise: a vibration sensor arranged to generate output signals representative of the vibration of the apparatus; and a control circuit arranged to generate drive signals for the SMA actuator wires in response to the output signals of the vibration sensor for stabilising the image sensed by the image sensor, and to supply the generated drive signals to the SMA actuator wires.

To allow better understanding, an embodiment of the present invention will now be described by way of non-limitative example with reference to the accompanying drawings, in which.

Figure 1:
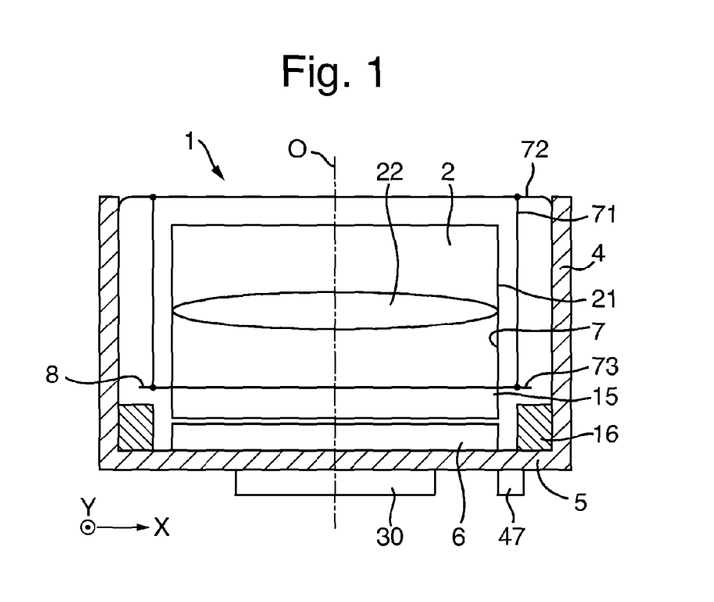
FIG. 1 is a schematic cross-sectional view of a camera apparatus.

A camera apparatus 1 that is an example of an SMA actuation apparatus in accordance with the present invention is shown in FIG. 1, which is a cross-sectional view taken along the optical axis O which is a notional, primary axis. In order to clearly describe the main parts of the camera apparatus 1, the SMA actuator wires are not shown in FIG. 1, but subsequently described with reference to FIGS. 3 to 5. The camera apparatus 1 is to be incorporated in a portable electronic device such as a mobile telephone, media player or portable digital assistant. Thus miniaturisation is an important design criterion.

The camera apparatus 1 comprises a lens element 2 supported on a support structure 4 by a suspension system 7, described in detail below, in a manner allowing movement of the lens element 2 relative to the support structure 4 in two orthogonal directions each perpendicular to the optical axis O. Thus, the lens element 2 is a movable element.

The support structure 4 is a camera support supporting an image sensor 6 on the front side of the base 5 thereof. On the rear side of the base 5 there is mounted an IC (integrated circuit) chip 30 in which the control circuit 40 is implemented, and also a gyroscope sensor 47.

The lens element 2 comprises a lens carrier 21 in the form of a cylindrical body supporting a lens 22 arranged along the optical axis O, although in general any number of lenses 22 may be provided. The camera apparatus 1 is a miniature camera in which the lens 22 (or lenses 22 if plural lenses are provided) has a diameter of at most 10 mm.

The lens element 2 is arranged to focus an image onto the image sensor 6. The image sensor 6 captures the image and may be of any suitable type, for example a CCD (charge-coupled device) or a CMOS (complimentary metal-oxide-semiconductor) device.

The lens 22 (or lenses 22 if plural lenses are provided) may be fixed relative to the lens carrier 21, or alternatively may be supported on the lens carrier in a manner in which the lens 22 (or at least one lens 22 if plural lenses are provided) is movable along the optical axis O, for example to provide focussing. Where the lens 22 is movable along the optical axis O, a suitable actuation system (not shown) may be provided, for example using a voice coil motor or SMA actuator wires, such as is described in WO-2007/113478.

In operation, the lens element 2 is moved orthogonally to the optical axis O in two orthogonal directions, shown as X and Y relative to the image sensor 6, with the effect that the image on the image sensor 6 is moved. This is used to provide OIS, compensating for image movement of the camera apparatus 1, caused by for example hand shake.

In many known arrangements using SMA actuator wire to provide an OIS function, for example as disclosed in WO-2010/029316 and WO-2010/089529, the OIS is provided by tilting the entire camera unit including the lens element and the image sensor, substantially as a rigid body. This method of compensating for user handshake does in principle give the best OIS performance, because aligning the lens element to the image sensor is difficult in miniature cameras and the manufacturing tolerances are very tight. In addition, the user handshake being compensated for is essentially a tilt to the camera, and so it makes intuitive sense that the compensation should also tilt the camera. However, in this example, OIS is performed differently in order to mitigate several other problems.

The first problem is that with the 'camera tilt' method, the image sensor is moving, relative to the fixed camera structure. This presents extreme difficulties in routing electrical connections from the image sensor to the fixed structure of the camera, and onto the mobile phone motherboard. Solutions to this centre around flexible printed circuits (FPC's) to route connections, but the FPC design remains challenging, owing to the large number of connections, and the high data rates. Therefore, it is highly desirable for the image sensor to remain stationary and fixed.

The second problem is that the camera tilt method implies that there is a camera structure comprising as a minimum the lens and image sensor, with support structures that must tilt inside a surrounding support structure. Because the camera has a finite footprint, the tilt of the camera means that the camera thickness (height) of the OIS camera must be greater than for an equivalent camera without OIS. In mobile phones, it is highly desirable to minimise the camera height.

The third problem, is that by tilting the whole camera, it is difficult to package the tilting actuators without increasing the footprint of the camera over that of the camera without OIS.

Accordingly, in this example, the lens element 2 is moved linearly in two orthogonal directions, both perpendicular to the optical axis O which may be termed "shift" or "OIS-shift". The resulting image compensation does not entirely reverse the effects of user handshake, but the performance is deemed sufficiently good, given the constraints described above, and in particular allows the size of the camera apparatus 1 to be reduced as compared to an apparatus using tilt.

Figure 2:
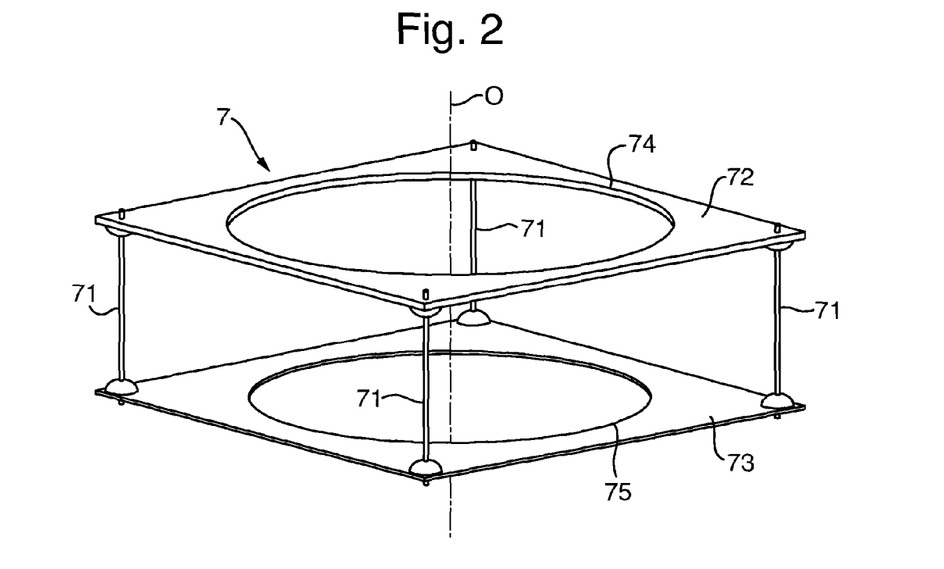
FIG. 2 is a perspective view of the suspension system of the camera apparatus.

The suspension system 7 is shown in isolation in FIG. 2 and arranged as follows.

The suspension system 7 comprises four beams 71 connected between a support plate 72 that forms part of the support structure 4 and a lens plate 73 that forms part of the lens element 2 and is connected to the rear end of the lens carrier 21 as shown in FIG. 1. The four beams 71 extend parallel to each other and to the optical axis O, and therefore extend perpendicular to the orthogonal directions in which the lens element 2 moves, although they could extend at a non-perpendicular angle, provided that they are transverse to the orthogonal directions.

The beams 71 are fixed to each of the support plate 72 and the lens plate 73 in a manner that the four beams 71 cannot rotate, for example by being soldered.

The beams 71 are positioned inside the support structure 4 and outside the lens carrier 21, the support plate 72 and the lens plate 73 having the same construction including respective apertures 74 and 75 aligned with the optical axis O to accommodate the lens element 2 and allow the passage of light to the image sensor 6. The beams 71 are equally spaced around the optical axis O, one at each corner of the camera apparatus 1.

The beams 71 thereby support the lens element 2 on the support structure 4 in said manner allowing movement of the lens element 2 relative to the support structure 4 in two orthogonal directions perpendicular to the optical axis O simply by means of the beams 71 bending, in particular in an S-shape. Conversely, the beams 71 resist movement along the optical axis O. The beams 71 may have any construction that provides the desired compliance perpendicular to the optical axis O, typically being formed by wires, for example metal wires.

In general, the suspension system 7 could have any alternative construction that allows movement of the lens element 2 relative to the support structure 4 in two orthogonal directions perpendicular to the optical axis O. For example, the suspension system 7 could employ ball bearings or flexures.

Movement of the lens element 2 is driven by an actuator arrangement 10 shown in FIGS. 3 to 5, as will now be described.

Figure 4:
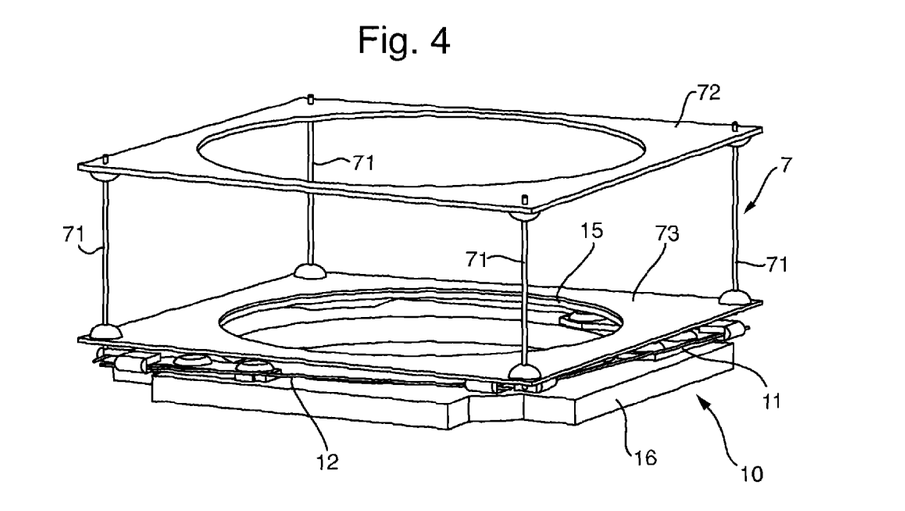
FIG. 4 is a perspective view of the arrangement of the suspension system and SMA actuator wires together.

The actuator arrangement 10 comprises a total of four SMA actuator wires 11 to 14 connected between a support block 16 that forms part of the support structure 4 and is mounted to the base 5 and a movable platform 15 that forms part of the lens element 2 and is mounted to the rear of the lens plate 73 as shown in FIGS. 1 and 4.

Each of the SMA actuator wires 11 to 14 is held in tension, thereby applying a force between the movable platform 15 and the support block 16 in a direction perpendicular to the optical axis O. In operation, the SMA actuator wires 11 to 14 move the lens element 2 relative to the support block 16 in two orthogonal directions perpendicular to the optical axis O, as described further below.

The SMA actuator wires 11 to 14 each extend perpendicular to the optical axis O. In this actuator arrangement 10, the SMA actuator wires 11 to 14 extend in a common plane which is advantageous in minimising the size of the actuator arrangement 10 along the optical axis O. This arrangement also minimises the force on the suspension system 7 in a direction parallel to the optical axis O.

As an alternative, the SMA actuator wires 11 to 14 may be arranged inclined at a non-zero angle to the orthogonal directions perpendicular to the optical axis O, which angle is preferably small. In this case, the SMA actuator wires 11 to 14 in operation generate a component of force along the optical axis O that may tend to tilt or to move the lens element 2 in a direction parallel to the optical axis O. Such a component of force may be resisted by the suspension system 7 to provide movement in the orthogonal directions perpendicular to the optical axis O. Conversely, the degree of inclination of the SMA actuator wires 11 to 14 that provides acceptably small tilting or movement in a direction along the optical axis O is dependent on the stiffness of the suspension system 7 along the optical axis O. Thus, relatively high inclinations are permissible in the case of the suspension system 7 having a high stiffness along the optical axis O, for example when comprising the beams 71 as described above or comprising ball bearings.

In the case where the suspension system 7 comprises of ball bearings, it may even be desirable for the SMA actuator wires 11 to 14 to be inclined with a significant component in a direction parallel to the optical axis O such that the tension in the SMA actuator wires 11 to 14 pushes the lens element 2 onto the ball bearings.

Irrespective of whether the SMA wires 11 to 14 are perpendicular to the optical axis O or inclined at a small angle to the plane perpendicular to the optical axis O, the actuator arrangement 10 can be made very compact, particularly in the direction along the optical axis O. The SMA actuator wires 11 to 14 are themselves very thin, typically of the order of 25 µm in diameter, to ensure rapid heating and cooling. The arrangement 10 of SMA actuator wires 11 to 14 barely adds to the footprint of the actuator arrangement 10 and may be made very thin in the direction along the optical axis O, since the SMA actuator wires 11 to 14 are laid essentially in a plane perpendicular to the optical axis O in which they remain in operation. The height along the optical axis then depends on the thickness of the other components such as the crimping members 17 and 18 described below and the height necessary to allow manufacture. In practice, it has been found that the actuator arrangement of SMA actuator wires 11 to 14 shown in FIG. 3 may be manufactured to a height of less than 1 mm. In the example of a mobile phone camera, the size of the SMA actuator wires 11 to 14 typically restricts the angle between the SMA actuator wires 11 to 14 and the plane perpendicular to the optical axis O to be less than 20 degrees, and more preferably less than 10 degrees.

The SMA actuator wires 11 to 14 are connected at one end to the movable platform 15 by respective crimping members 17 and at the other end to the support block 16 by crimping members 18. The crimping members 17 and 18 crimp the wire to hold it mechanically, optionally strengthened by the use of adhesive. The crimping members 17 and 18 also provide an electrical connection to the SMA actuator wires 11 to 14. However, any other suitable means for connecting the SMA actuator wires 11 to 14 may alternatively be used.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 11 to 14 causes them to decrease in length. The SMA actuator wires 11 to 14 may be made of any suitable SMA material, for example Nitinol or another Titanium-alloy SMA material. Advantageously, the material composition and pre-treatment of the SMA actuator wires 11 to 14 is chosen to provide phase change over a range of temperature that is above the expected ambient temperature during normal operation and as wide as possible to maximise the degree of positional control.

On heating of one of the SMA actuator wires 11 to 14, the stress therein increases and it contracts. This causes movement of the lens element 2. A range of movement occurs as the temperature of the SMA increases over the range of temperature in which there occurs the transition of the SMA material from the Martensite phase to the Austenite phase. Conversely, on cooling of one of the SMA actuator wires 11 to 14 so that the stress therein decreases, it expands under the force from opposing ones of the SMA actuator wires 11 to 14. This allows the lens element 2 to move in the opposite direction.

Figure 5:
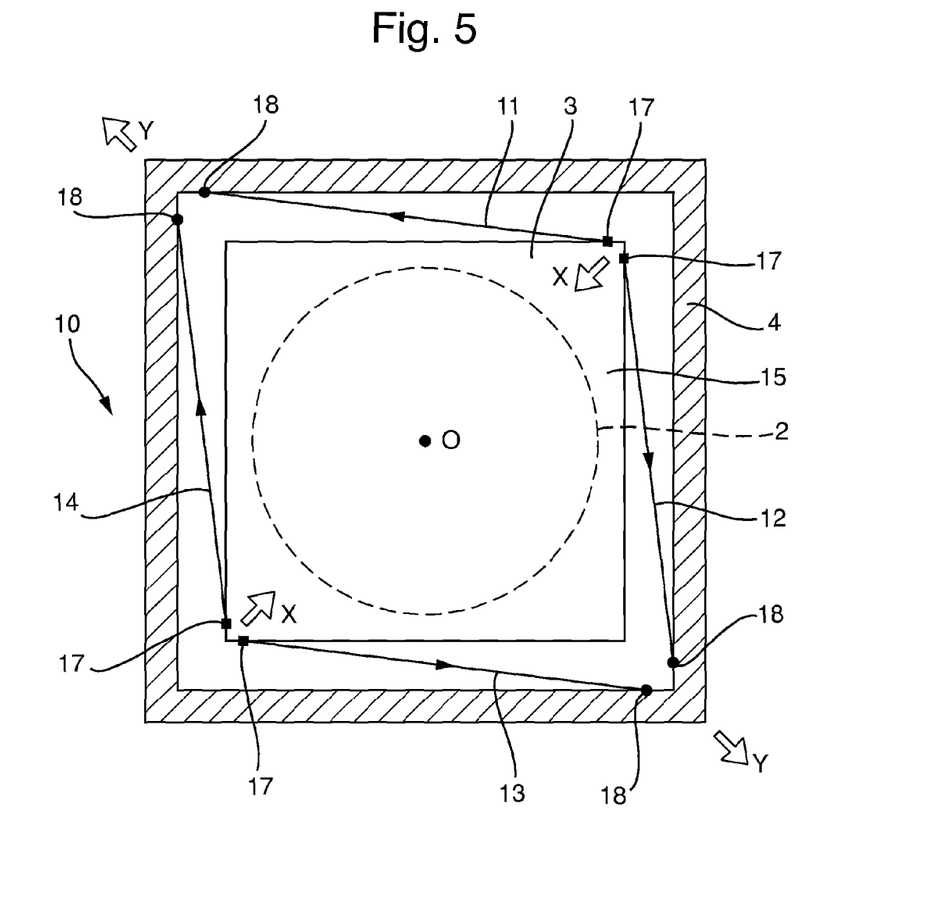
FIG. 5 is a plan view of the arrangement of SMA actuator wires along the optical axis.

As shown in FIG. 5, the SMA actuator wires 11 to 14 have an arrangement around the optical axis O as follows.

Each of the SMA actuator wires 11 to 14 is arranged along one side of the lens element 2. Thus, the SMA actuator wires 11 to 14 are arranged in a loop at different angular positions around the optical axis O. Thus, the four SMA actuator wires 11 to 14 consist of a first pair of SMA actuator wires 11 and 13 arranged on opposite sides of the optical axis O and a second pair of SMA actuator wires 12 and 14 arranged on opposite sides of the optical axis O. The first pair of SMA actuator wires 11 and 13 are capable on selective driving to move the lens element 2 relative to the support structure 4 in a first direction in said plane, and the second pair of SMA actuator wires 12 and 14 are capable on selective driving to move the lens element 2 relative to the support structure 4 in a second direction in said plane transverse to the first direction. Movement in directions other than parallel to the SMA actuator wires 11 to 14 may be driven by a combination of actuation of these pairs of the SMA actuator wires 11 to 14 to provide a linear combination of movement in the transverse directions. Another way to view this movement is that simultaneous contraction of any pair of the SMA actuator wires 11 to 14 that are adjacent each other in the loop will drive movement of the lens element 2 in a direction bisecting those two of the SMA actuator wires 11 to 14 (diagonally in FIG. 5, as labelled by the arrows X and Y).

As a result, the SMA actuator wires 11 to 14 are capable of being selectively driven to move the lens element 2 relative to the support structure 4 to any position in a range of movement in two orthogonal directions perpendicular to the optical axis O. The magnitude of the range of movement depends on the geometry and the range of contraction of the SMA actuator wires 11 to 14 within their normal operating parameters.

The position of the lens element 2 relative to the support structure 4 perpendicular to the optical axis O is controlled by selectively varying the temperature of the SMA actuator wires 11 to 14. This is achieved by passing through SMA actuator wires 11 to 14 selective drive currents that provides resistive heating. Heating is provided directly by the drive current. Cooling is provided by reducing or ceasing the drive current to allow the lens element 2 to cool by conduction, convection and radiation to its surroundings.

The arrangement of the SMA actuator wires 11 to 14 along respective sides of the lens element 2 assists in providing a compact arrangement since each of the SMA actuator wires 11 to 14 fits largely or entirely within the profile of the lens element 2 as viewed from that side, unlike for example an arrangement in which wires extend radially of the optical axis O, which would increase the footprint of the camera apparatus 1. However as a result of not being radial, each SMA actuator wire 11 to 14 individually applies a torque to the lens element 2 in the plane of the two orthogonal directions around the optical axis O. Such torques potentially increase the requirements on the suspension system 7 which needs to resist any net torque, whilst permitting movement in that plane.

However, since none of the wires are collinear, they can be arranged to apply cancelling torques when operated together. Successive SMA actuator wires 11 to 14 around the optical axis O are connected to apply a force to the lens element 2 in alternate senses around the optical axis O. That is, as viewed outwardly of the optical axis, the SMA actuator wire 11 is connected at its left end to the support block 16 and its right end to the movable platform 15, but the next SMA actuator wire 12 is connected at its left end to the movable platform 15 and its right end to the support block 16, and so on. As a result, successive SMA actuator wires 11 to 14 around the optical axis O also apply a torque in alternate senses around the optical axis O. That is, when viewed as shown in FIG. 5, the SMA actuator wire 11 applies a force to the lens element 2 in an anticlockwise sense, but the next SMA actuator wire 12 applies a force to the lens element 2 that in a clockwise sense, and so on.

This means that the first pair of SMA actuator wires 11 and 13 generate a net torque to the lens element 2 in said plane around the optical axis O in a first sense (anti-clockwise in FIG. 5), and the second pair of SMA actuator wires 12 and 14 generate a net torque to the lens element 2 in said plane around the optical axis O that is in an opposite sense (clockwise in FIG. 5). As a result, for an arbitrary degree of heating in each SMA actuator wire 11 to 14, the torques tend to cancel.

Moreover, with this arrangement movement to any position in the range of movement may in principle be achieved without applying any net torque to the lens element 2 in the plane of the two orthogonal directions around the optical axis O. To appreciate this, one can consider the first pair of SMA actuator wires 11 and 13 separately from the second pair of SMA actuator wires 12 and 14. For movement to any given position in two dimensions, the movement derived from the first pair of SMA actuator wires 11 and 13 may be obtained with a range of stresses in the first pair of SMA actuator wires 11 and 13, and hence with a range of torques in the first sense. Similarly the movement derived from the second pair of SMA actuator wires 12 and 14 may be obtained with a range of stresses in the second pair of SMA actuator wires 12 and 14, and hence with a range of torques in the second sense. This means the torques can be balanced by appropriate selection of the stresses in each SMA actuator wire 11 to 14, based on a simply geometrical calculation relating the desired position and the arrangement of SMA actuator wires 11 to 14.

In contrast, if all the SMA actuator wires 11 to 14 were connected to apply a force to the lens element 2 in the same sense around the optical axis O then they would always generate a net torque around the optical axis O irrespective of how they were driven.

When moving the lens element 2 in other directions that are a linear combination of movement in directions X and Y, some degree of balancing is a natural effect of the arrangement, and indeed by appropriate selection of the forces generated in each one of the SMA actuator wires 11 to 14, it is possible to cause the SMA actuator wires 11 to 14 to generate no net torque around the optical axis O.

This reduction of torque around the optical axis O reduces the tendency for the lens element 2 to rotate around the optical axis O. The reduction or balancing of torques around the optical axis O reduces the constraints on the suspension system 7. In fact, in some embodiments, the constraints may be reduced to the extent that no suspension system is needed, and the lens element 2 is instead supported by the SMA actuator wires 11 to 14 themselves.

It is noted in particular that these benefits can be achieved in this actuator arrangement 10 employing just a single set of four SMA actuator wires 11 to 14, which provides for a very simple and compact arrangement.

In this actuator arrangement 10, the SMA actuator wires 11 to 14 extend in a common plane which is advantageous in minimising the size of the actuator arrangement 10 along the optical axis O. Alternatively, the SMA actuator wires 11 to 14 could be offset from each other along the optical axis O and still obtain the benefits described above, if they meet the more general requirement that projections of the four SMA actuator wires 11 to 14 onto a notional plane perpendicular to the optical axis O have the arrangement shown in FIG. 5 when viewed in that direction.

Figure 6:
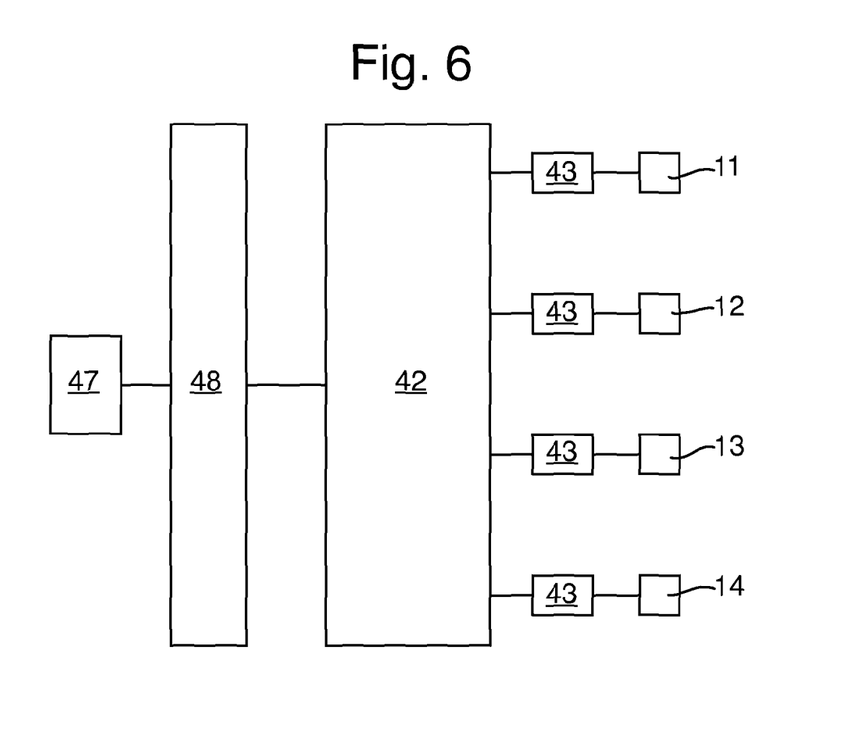
FIG. 6 is a diagram of a control circuit for the SMA actuator wires.

The control of the SMA actuator wires 11 to 14 is effected by the control circuit 40 shown in FIG. 6 which generates drive signals for each of the SMA actuator wires 11 to 14 and is arranged as follows.

The control circuit 40 includes a gyroscope sensor 47 that outputs a signal representative of the angular velocity of the lens element 2, thereby acting as a vibration sensor that detects the vibrations that the camera apparatus 1 is experiencing. The gyroscope sensor 47 is typically a pair of miniature gyroscopes, for detecting vibration around two axes perpendicular to each other and the optical axis O, although in general larger numbers of gyroscopes or other types of vibration sensor could be used.

The output signals from the gyroscope sensor 47 are supplied to an OIS controller 48 that may be implemented in a processor. The OIS controller 48 derives movement signals that represent the movement of the lens element 2 needed to compensate for the movement of the camera apparatus 1 as a whole, and therefore stabilise the image sensed by the image sensor 6. As the gyroscope sensor 47 is mounted on the support structure 4 the output signals are representative of the vibration of the support structure 4. OIS is effected by moving the lens element 2 laterally in opposition. Accordingly, the OIS controller 48 generates movement signals providing a desired movement which is opposite to the actual tilt as measured by the gyroscope sensor 47. The OIS controller 48 may process the output signals from the gyroscope sensor 47, for example by filtering them, prior to generating the movement signals.

The movement signals from the OIS controller 48 are supplied to a matrix controller 42 that may be implemented in a processor or in hardware. Although the matrix controller 42 and the OIS controller 48 are illustrated as separate components for ease of understanding, they may be implemented in a common processor.

The matrix controller 42 generates a control signal for each of the SMA actuator wires 11 to 14 on the basis of the movement signals. This uses a matrix calculation that relates the necessary contraction or expansion (i.e. length) of each one of the SMA actuator wires 11 to 14 to achieve the desired movement. Any desired movement has components in each of the first and second directions in which movement is driven by the pairs of the SMA actuator wires 11 to 14 identified above. Thus, for each of those components of the desired movement represented by the movement signal, the control signals provide for differential contraction of those pairs of the SMA actuator wires 11 to 14. The differential components representing differential contractions of different pairs of the SMA actuator wires 11 to 14 may be added linearly. In this manner, any desired movement may be translated into control signals for selectively actuating an appropriate combination of the SMA actuator wires 11 to 14. Thus the matrix calculation takes into account the actual geometrical arrangement of the SMA actuator wires 11 to 14 in the camera apparatus 1.

At the same time, the matrix calculation may be further arranged to generate control signals that cause the SMA actuator wires 11 to 14 to provide no net component of torque around the optical axis O. That is the stresses in the first pair of SMA actuator wires 11 and 13 and in the second pair of SMA actuator wires 12 and 14 are selected to balance the torques generated thereby. However, a reduction of the net torque on the lens element 2 is still achieved even if the torques are not exactly balanced.

Alternatively, the matrix calculation may be arranged to generate control signals that cause the SMA actuator wires 11 to 14 to provide a predetermined amount of torque around the optical axis O. That is the stresses in the first pair of SMA actuator wires 11 and 13 and in the second pair of SMA actuator wires 11 and 13 are selected to provide torques that are offset. This may be useful, for example, if the suspension system 7 applies a torque to the lens element 2 in the plane of the two orthogonal directions around the optical axis O. In that case, the predetermined amount of torque may be selected to compensate for torque applied by the suspension system 7, preferably exactly.

The control signals may be modified by various compensation algorithms to compensate for non-linear effects such as hysteresis in the SMA material.

Figure 7:
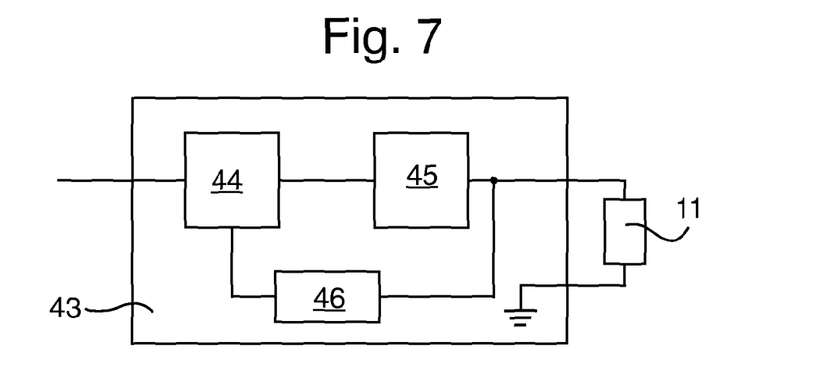
FIG. 7 is a diagram of a drive circuit of the control circuit.

Each one of the SMA actuator wires 11 to 14 is connected to a respective drive circuit 43 that is supplied by the matrix controller 42 with the control signal for the corresponding one of the SMA actuator wires 11 to 14. The drive circuits 43 generate a drive signal in accordance with the control signal and supply the drive signal to the SMA actuator wire 11 to 14. The drive circuits 43 have an identical arrangement which is shown in FIG. 7 in respect of the first SMA actuator wire 11 and arranged as follows.

The drive circuit 43 includes a drive controller 44 that is supplied with the control signal from the matrix controller 42 and controls a driver 45 using resistance feedback. The drive controller 44 may be implemented in a processor. Although the matrix controller 42 and the drive controllers 44 are illustrated as separate components for ease of understanding, they may be implemented in a common processor.

The driver 45 is connected to supply the drive current to the SMA actuator wire 11. The driver 45 may be a constant-voltage current source or a constant-current current source. For example, in the latter case the constant current might be of the order of 120 mA.

The drive circuit 43 further includes a detection circuit 46 arranged to detect the resistance of the SMA actuator wire 11. In the case that the driver 45 is a constant-current current source, the detection circuit 46 may be a voltage detection circuit operable to detect the voltage across the SMA actuator wire 11 which is a measure of the resistance of the SMA actuator wire 1. In the case that the driver 45 is a constant-voltage current source, the detection circuit 46 may be a current detection circuit. For a higher degree of accuracy the detection circuit 46 may comprise a voltage detection circuit and a current detection circuit operable to detect both the voltage and current across the SMA actuator and to derive a measure of resistance as the ratio thereof The drive controller 44 is arranged to control the driver 45 to supply a pulse-width modulated current. The drive controller 44 receives the resistance measured by the detection circuit 46 and uses it as a feedback signal in a closed-loop control algorithm to control the PWM duty cycle of the driver 45 to actuate the SMA actuator wire 11 in accordance with the demand represented by the overall control signal. The closed-loop control may be proportional.

By using the electrical resistance of the SMA actuator wire 11 as a feedback parameter that relates to position, over the functional movement range the contraction and expansion of the SMA material is approximately linear with its electrical resistance. Non-linearities, including hysteresis and creep, occur to some extent. These may be ignored, but for better linearity, these may be accounted for in the closed-loop control algorithm.

The SMA actuator wires 11 to 14 may be provided with a sufficient speed of response to provide OIS. Typically each one of the SMA actuator wire 11 to 14 is proportionally driven so as to control the position over a frequency bandwidth up to 10 Hz, up to 20 Hz, or up to 30 Hz. A perceived drawback of SMA as an actuator is its slow response time. As an SMA material is thermally driven, the response time is limited by the temperature change achievable, being associated with thermal conductivity, specific heat capacity, and thermal mass.

Whilst heating of the SMA actuator wires 11 to 14 can be increased by increasing the power of the drive current, cooling is dependent on the thickness of the SMA actuator wires 11 to 14. This thickness is selected to provide the desired response time during cooling. For example, if the SMA actuator wires 11 to 14 are of thickness 25 μm, being currently the thinnest available commercial material, the thermal response begins to roll off at 4 Hz. Based on analysis of the OIS function, the functional requirement is to provide movement compensation over a bandwidth of up to 30 Hz. However, the amplitude of response required drops markedly over the operating bandwidth, typically for the camera apparatus 1 described above from about 70 μm at about 1 Hz, to less than about 10 μm at over 20 Hz. Surprisingly, in spite of the roll-off in SMA actuator wire response above 4 Hz, the SMA actuator wires 11 to 14 are still able to deliver the displacement requirements at 30 Hz, and so are able to successfully meet the actuation requirements of the OIS for miniature cameras.

Figure 3:
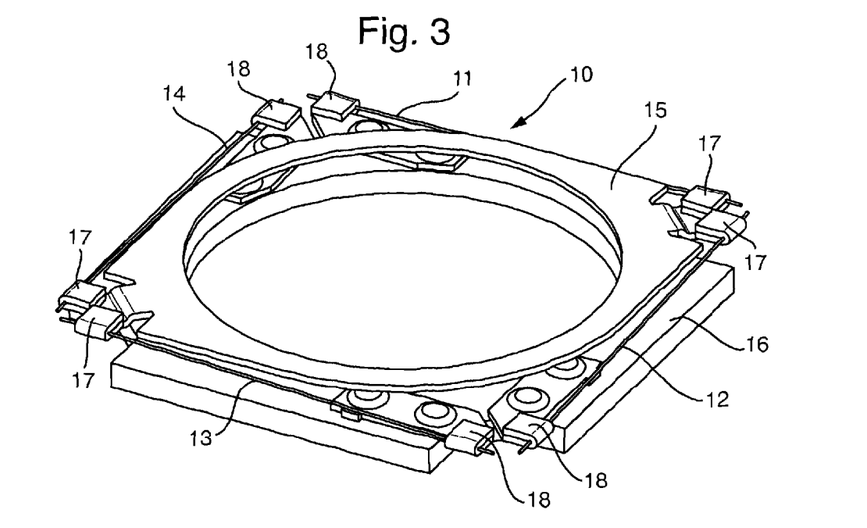
FIG. 3 is a perspective view of the arrangement of SMA actuator wires in the camera apparatus.

The SMA actuator wires 11 to 14 may have arrangements other than that shown in FIGS. 3 to 5 in which the SMA actuator wires 11 to 14 are capable of being selectively driven to move the lens element 2 relative to the support structure to any position in the range of movement without applying any net torque to the lens element 2 in the plane of the two orthogonal directions around the optical axis O.

Some possible alternative arrangements are shown in FIGS. 8 to 13 which are schematic views along the optical axis O showing the arrangement of SMA actuator wires 11 to 14 around the optical axis O, and also the crimping members 17 and 18 so as to illustrate the connections to the lens element 2 and the support structure 4. For clarity, the other components of the camera apparatus 1 are omitted. The camera apparatus 1 in each case has a similar structure to that shown in FIGS. 3 to 5 with modifications to the shape of the elements of the lens element 2 and the support structure 4 to accommodate the different positions of the crimping members 17 and 18, crimping members 17 being fixed to the lens element 2 and crimping members 18 being fixed to the support structure 4.

Figure 8:
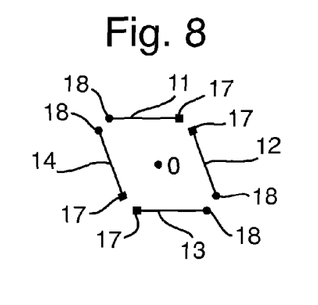
FIGS. 8 to 16 are schematic diagrams of different possible arrangements for the SMA actuator wires.
Figure 9:
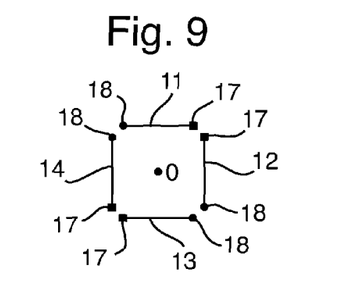

For the sake of comparison, FIG. 8 illustrates the arrangement of FIG. 5. In this case, the SMA actuator wires 11 to 14 are arranged in a rhomboid. Provided that the SMA actuator wires 11 to 14 are transverse, it is not necessary that they are perpendicular. In contrast, in the arrangement of FIG. 9, the SMA actuator wires 11 to 14 are perpendicular and hence in a square shape.

Figure 10:
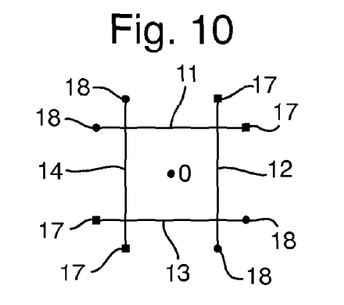
Figure 11:
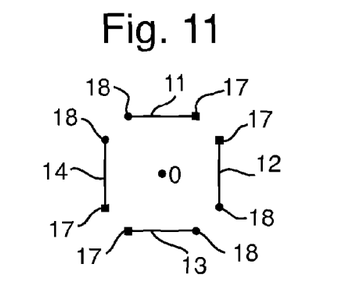

Although in FIG. 5 the SMA actuator wires 11 to 14 are connected in a loop with the crimping members 17 and 18 of successive SMA actuator wires 11 to 14 in close proximity, as alternatives the SMA actuator wires 11 to 14 may cross as in the example shown in FIG. 10 or may have gaps as in the example shown in FIG. 11.

Figure 12:
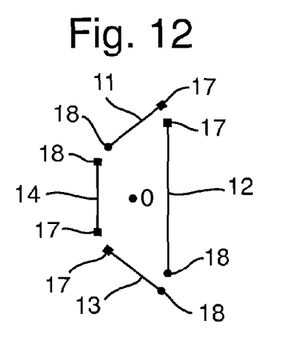
Figure 13:
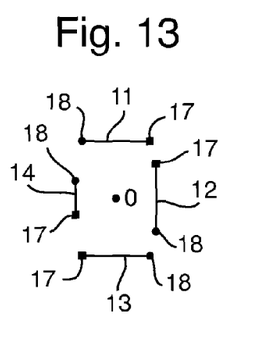

The SMA actuator wires 11 to 14 need not be the same length. For example, in any of the previous examples, the SMA actuator wires 11 to 14 may be of the same length within each pair but different as between the pairs. In another example shown in FIGS. 12 and 13, the first pair of SMA actuator wires 11 and 13 are of the same length as each other but the second pair of SMA actuator wires 12 and 14 are of different lengths. In the example of FIG. 12, the first pair of SMA actuator wires 11 and 13 are not parallel but inclined relative to one another so that the crimping members 17 and 18 of successive SMA actuator wires 11 to 14 remain in close proximity, whereas in the example of FIG. 13, the first pair of SMA actuator wires 11 and 13 are parallel.

Figure 14:
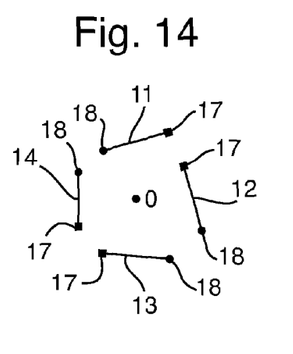
Figure 15:
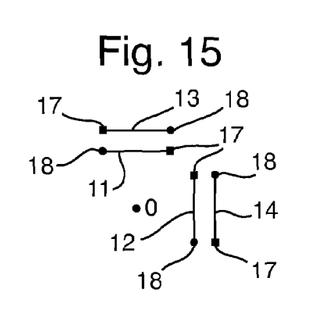
Figure 16:
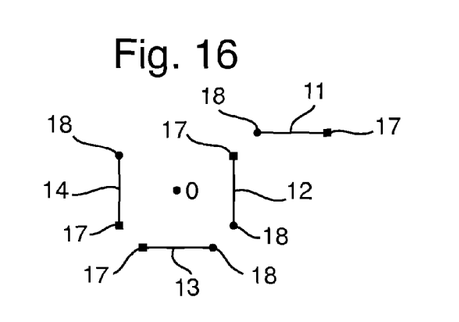

In general, it is not necessary for the SMA actuator wires 11 to 14 to be in a symmetrical or regular arrangement. An example of this is shown in FIG. 14 wherein the SMA actuator wires 11 to 14 are arranged in a loop but with differing lengths and at non-perpendicular angles to each other. Also, it is not necessary for the SMA actuator wires 11 to 14 to be arranged in a loop. An example of this is shown in FIG. 15, wherein, within the pairs, the SMA actuator wires 11 to 14 are arranged on the same side of the optical axis O. That is, the first pair of SMA actuator wires 11 and 13 are each on a first side of the optical axis O and the second pair of SMA actuator wires 12 and 14 are each on a perpendicular side of the optical axis O. In this case, it is possible to balance the torques in a similar manner since each of the first pair of SMA actuator wires 11 and 13 and the second pair of SMA actuator wires 12 and 14 are capable of generating a torque in an opposite sense around the optical axis. Whilst this may be more convenient for packaging the camera apparatus 1, it may require operation at higher stresses to achieve a similar degree of balancing to the example of FIG. 5 since the distance between SMA actuator wires 11 to 14 within each pair is smaller, and hence the torques generated for a given stress are lower. Another example in which the wires are not arranged in a loop is shown in FIG. 16.

Various modifications to the camera apparatus 1 described above are possible. The lens element 2 has a square shape as viewed along a primary axis but more generally could have any shape. The support structure 4 is illustrated schematically but could in general be any type of element suitable for supporting the lens element 2. More generally, the same type of actuator arrangement 10 may in general be applied to any type of movable element including ones other than a lens element.

The invention claimed is:
1. A camera apparatus comprising:
a support structure;
an image sensor fixed to the support structure;
a camera lens element comprising one or more lenses arranged to focus an image on the image sensor, the camera lens element having an optical axis and being supported on the support structure in a manner allowing movement of the camera lens element relative to the support structure across a range of movement in two orthogonal directions perpendicular to the optical axis of the camera lens element; and
a total of four SMA actuator wires each connected at one to the camera lens element and at the other end to the support structure in an arrangement wherein none of the SMA actuator wires are collinear, and wherein the SMA actuator wires are capable of being selectively driven to move the camera lens element relative to the support structure to any position in said range of movement in two orthogonal directions perpendicular to the optical axis of the camera lens element, in a manner in which each SMA actuator wire applies a torque around the optical axis, but without the SMA actuator wires applying any net torque to the camera lens element in the plane of the two orthogonal directions around the optical axis of the camera lens element.

2. The camera apparatus according to claim 1, wherein the at least one lens has a diameter of at most 10 mm.

3. The camera apparatus according to claim 1, wherein the camera lens element comprises a lens carrier on which the one or more lenses are supported in a manner in which at least one of the one or more lenses is movable along the optical axis of the camera lens element.

4. The camera apparatus according to claim 1, further comprising:
a vibration sensor arranged to generate output signals representative of the vibration of the apparatus; and
a control circuit arranged to generate drive signals for the SMA actuator wires in response to the output signals of the vibration sensor for driving the movement of the camera lens element to stabilize the image sensed by the image sensor, and to supply the generated drive signals to the SMA actuator wires.

5. The camera apparatus according to claim 4, wherein the control circuit is arranged to generate drive signals for driving the movement of the camera lens element to stabilize the image sensed by the image sensor without applying any torque to the camera lens element in the plane of the two orthogonal directions around the optical axis of the camera lens element.

6. The camera apparatus according to claim 1, further comprising a control circuit arranged to generate drive signals for the SMA actuator wires, and to supply the generated drive signals to the SMA actuator wires.

7. The camera apparatus according to claim 6, wherein the control circuit is arranged to generate drive signals for driving the movement of the camera lens element without applying any torque to the camera lens element in the plane of the two orthogonal directions around the optical axis of the camera lens element.

8. The camera apparatus according to claim 6, wherein the control circuit is arranged to generate drive signals for driving the movement of the camera lens element whilst applying a predetermined amount of torque to the camera lens element in the plane of the two orthogonal directions around the optical axis of the lens element.

9. The camera apparatus according to claim 8, further comprising a suspension system supporting the camera lens element on the support structure in said manner allowing movement of the camera lens element relative to the support structure in two orthogonal directions each perpendicular to the optical axis of the camera lens element, wherein the suspension system applies a torque to the camera lens element in the plane of the two orthogonal directions around the optical axis of the camera lens element and the predetermined amount of torque applied by the generated drive signals compensates for torque applied by the suspension system.

10. The camera apparatus according to claim 1, wherein the four SMA actuator wires are arranged in a loop at different angular positions around the optical axis of the camera lens element, successive SMA actuator wires around the optical axis of the camera lens element being connected to apply a force to the camera lens element in alternate senses around the optical axis of the camera lens element.

11. The camera apparatus according to claim 1, wherein the four SMA actuator wires consist of two pairs of SMA actuator wires wherein the first pair of SMA actuator wires is arranged to be capable of being selectively driven to drive the camera lens element relative to the support structure in a first direction in said plane, and to generate a net torque to the camera lens element in said plane around the optical axis of the camera lens element, and the second pair of SMA actuator wires is arranged to be capable of being selectively driven to drive the camera lens element relative to the support structure in a second direction in said plane transverse to the first direction, and to generate a net torque to the camera lens element said plane around the optical axis of the camera lens element that is in an opposite sense to the first pair of SMA wires.

12. The camera apparatus according to claim 11, wherein within each pair of SMA actuator wires, the two SMA actuator wires are arranged on opposite sides of the optical axis of the camera lens element.

13. The camera apparatus according to claim 1, wherein each of the SMA actuator wires extends perpendicular to the optical axis of the camera lens element.

14. The camera apparatus according to claim 13, wherein the SMA actuator wires extend in a common plane.

15. The camera apparatus according to claim 1, further comprising a suspension system supporting the camera lens element on the support structure in said manner allowing movement of the camera lens element relative to the support structure in two orthogonal directions each perpendicular to the optical axis of the camera lens element.

16. The camera apparatus according to claim 15, wherein the suspension system comprises a plurality of beams extending transverse to said two orthogonal directions.

17. The camera apparatus according to claim 16, wherein the beams extend parallel to the optical axis of the camera lens element.

18. The camera apparatus according to claim 16, wherein the beams are formed by wires.

19. An SMA actuation apparatus for moving a movable element relative to a support structure in two orthogonal directions, the SMA actuation apparatus comprising:
a support structure;
a movable element supported on the support structure in a manner allowing movement of the movable element relative to the support structure across a range of movement in two orthogonal directions perpendicular to a notional primary axis extending through the movable element; and
a total of four SMA actuator wires connected between the movable element and the support structure in an arrangement wherein none of the SMA actuator wires are collinear, and wherein the SMA actuator wires are capable of being selectively driven to move the movable element relative to the support structure to any position in said range of movement without applying any net torque to the movable element in the plane of the two orthogonal directions around the primary axis,
wherein two of the SMA actuator wires are connected between the movable element and the support structure to each apply a torque to the movable element in said plane around the primary axis in a first sense around the primary axis and the other two SMA actuator wires are connected between the movable element and the support structure to each apply a torque to the movable element in said plane around the primary axis in a second, opposite sense around the primary axis.

20. An SMA actuation apparatus for moving a movable element relative to a support structure in two orthogonal directions, the SMA actuation apparatus comprising:
a support structure;
a movable element supported on the support structure in a manner allowing movement of the movable element relative to the support structure across a range of movement in two orthogonal directions perpendicular to a notional primary axis extending through the movable element; and a total of four SMA actuator wires connected between the movable element and the support structure in an arrangement wherein none of the SMA actuator wires are collinear, and wherein the SMA actuator wires are capable of being selectively driven to move the movable element relative to the support structure to any position in said range of movement without applying any net torque to the movable element in the plane of the two orthogonal directions around the primary axis, wherein the four SMA actuator wires consist of two pairs of SMA actuator wires wherein the first pair of SMA actuator wires is arranged to be capable of being selectively driven to drive the movable element relative to the support structure in a first direction in said plane, and to generate a net torque to the movable element in said plane around the primary axis, and the second pair of SMA actuator wires is arranged to be capable of being selectively driven to drive the movable element relative to the support structure in a second direction in said plane transverse to the first direction, and to generate a net torque to the movable element in said plane around the primary axis that is in an opposite sense to the first pair of SMA wires, and, within each pair of SMA actuator wires, the two SMA actuator wires are arranged on the same side of the primary axis at different distances from the primary axis.

* * * * *